(12) United States Patent
Pascotti et al.

(10) Patent No.: US 6,272,974 B1
(45) Date of Patent: Aug. 14, 2001

(54) BEVERAGE BREWING PRESS

(75) Inventors: James Pascotti, Harrisburg; Samuel W. Apicelli, Camp Hill, both of PA (US)

(73) Assignee: L'Equip, Inc, Lemoyne, PA (US)

( * ) Notice: Subject to any disclaimer, the term of this patent is extended or adjusted under 35 U.S.C. 154(b) by 0 days.

(21) Appl. No.: 09/619,519

(22) Filed: Jul. 19, 2000

(51) Int. Cl.$^7$ ...................................................... A47J 31/00
(52) U.S. Cl. ................................ 99/318; 99/295; 99/279; 99/304
(58) Field of Search ................................ 99/279, 287, 295, 99/302 C, 304, 302 R, 316, 317, 318, 319, 306, 307

(56) References Cited

U.S. PATENT DOCUMENTS

| | | | |
|---|---|---|---|
| D. 382,764 | 8/1997 | Brady | D7/317 |
| D. 405,641 | 2/1999 | Brady | D7/319 |
| 427,568 | * 5/1890 | Halstead | 99/322 X |
| 2,569,820 | * 10/1951 | Locke | 99/281 |
| 2,887,037 | * 5/1959 | Setecka | 99/318 |
| 4,230,033 | 10/1980 | Cuccia | 99/287 |
| 4,365,544 | 12/1982 | Howitt | 99/297 |
| 4,473,003 | 9/1984 | Stone, Jr. | 99/305 |
| 4,704,954 | 11/1987 | Mollenhoff | 99/279 |
| 4,796,521 | 1/1989 | Grossi | 99/287 |
| 4,873,916 | 10/1989 | Piscaer | 99/289 |
| 5,115,730 | 5/1992 | Göckelmann | 99/280 |
| 5,228,383 | 7/1993 | Landais et al. | 99/289 |
| 5,255,594 | 10/1993 | Grossi | 99/287 |
| 5,461,968 | 10/1995 | Portman | 99/287 |
| 5,478,592 | 12/1995 | Kingsley et al. | 426/594 |
| 5,495,793 | 3/1996 | Muis et al. | 99/280 |
| 5,560,284 | 10/1996 | Weidman et al. | 99/281 |
| 5,809,867 | 9/1998 | Turner et al. | 99/297 |
| 5,880,441 | 3/1999 | Hartman et al. | 219/689 |
| 5,921,168 | 7/1999 | Nello | 99/295 |
| 5,924,354 | * 7/1999 | Court et al. | 99/318 |

* cited by examiner

*Primary Examiner*—Reginald L. Alexander
(74) *Attorney, Agent, or Firm*—Duane, Morris & Heckscher LLP

(57) ABSTRACT

A beverage brewing press is provided that includes a brewing vessel defining a chamber having an axis and that is supported by a housing. Positioned within the brewing vessel is a fixed partition and a partition that is movable about the axis relative to the fixed partition. The movable partition includes at least one porous receptacle that encloses a brewable material.

25 Claims, 6 Drawing Sheets

BEVERAGE BREWING PRESS

FIELD OF THE INVENTION

The present invention generally relates to automatic beverage makers, and more particularly to automatic beverage makers that press brewable materials in a liquid medium to produce a flavored beverage.

BACKGROUND OF THE INVENTION

The French press or coffee press has become a preferred way of brewing coffee among professional coffee tasters and the coffee drinking public in general. The coffee press is a relatively simple device comprising a pitcher (typically made of glass), a lid with a central hole, and a plunger fitted with a fine mesh screen or filter which is operated through the hole in the lid. In use, the ground coffee is placed in the pitcher and boiling water is added. The top is placed on the pitcher with the plunger withdrawn so that the filter is above the grounds and the water, allowing the coffee to brew. After about five minutes, the plunger is pushed down towards the bottom of the pitcher, so that the coffee grounds are separated from the liquid. While the coffee press has the ability to make superior coffee, it has several drawbacks. For one thing, conventional coffee presses allow the coffee to cool rapidly, thus losing the desired taste and temperature. For another thing, prior art coffee presses must be manually operated, requiring the full attention of the brewer during the brewing process.

Automatic drip brewing devices are also known for preparing coffee or tea by controlled delivery of heated water from a water reservoir through a porous filter holding coffee, tea, or another brewable material in a filter basket which drains into a separate receptacle, such as a carafe or pitcher which is not connected to the device. The brewed beverage is then poured from the pitcher. A warming element in a base on which the pitcher rests transfers some heat to the brewed beverage.

Automatic drip brewing devices are intended primarily for home use, and are dimensioned to produce and hold relatively small quantities of brewed beverage in the pitcher or carafe, e.g., a total of eight to ten cups produced in a single brewing cycle. The relatively small size of these pitchers and brewing devices does not normally provide sufficient space to allow for the pressing of the brewable material. In addition, automatic drip brewing devices rely upon the draining of liquid through the brewable material, e.g., coffee grounds, rather than a true steeping of the brewable material in the liquid prior to filtering and draining. Thus, prior art brewing devices provide a less than desirable means for preparing a brewed beverage.

As a consequence, there has been a long felt need for a brewed beverage press that is sized and shaped to allow for automatic press brewing of coffee or similar brewable beverages.

SUMMARY OF THE INVENTION

The present invention provides a beverage brewing press comprising a brewing vessel that defines a chamber having an axis and that is supported by a housing. Positioned within the brewing vessel is a fixed partition and a partition that is movable about the axis relative to the fixed partition. The movable partition includes at least one porous receptacle that encloses a brewable material.

BRIEF DESCRIPTION OF THE DRAWINGS

These and other features and advantages of the present invention will be more fully disclosed in, or rendered obvious by, the following detailed description of the preferred embodiments of the invention, which are to be considered together with the accompanying drawings wherein like numbers refer to like parts and further wherein.

DETAILED DESCRIPTION OF THE PREFERRED EMBODIMENT

Figure 1:
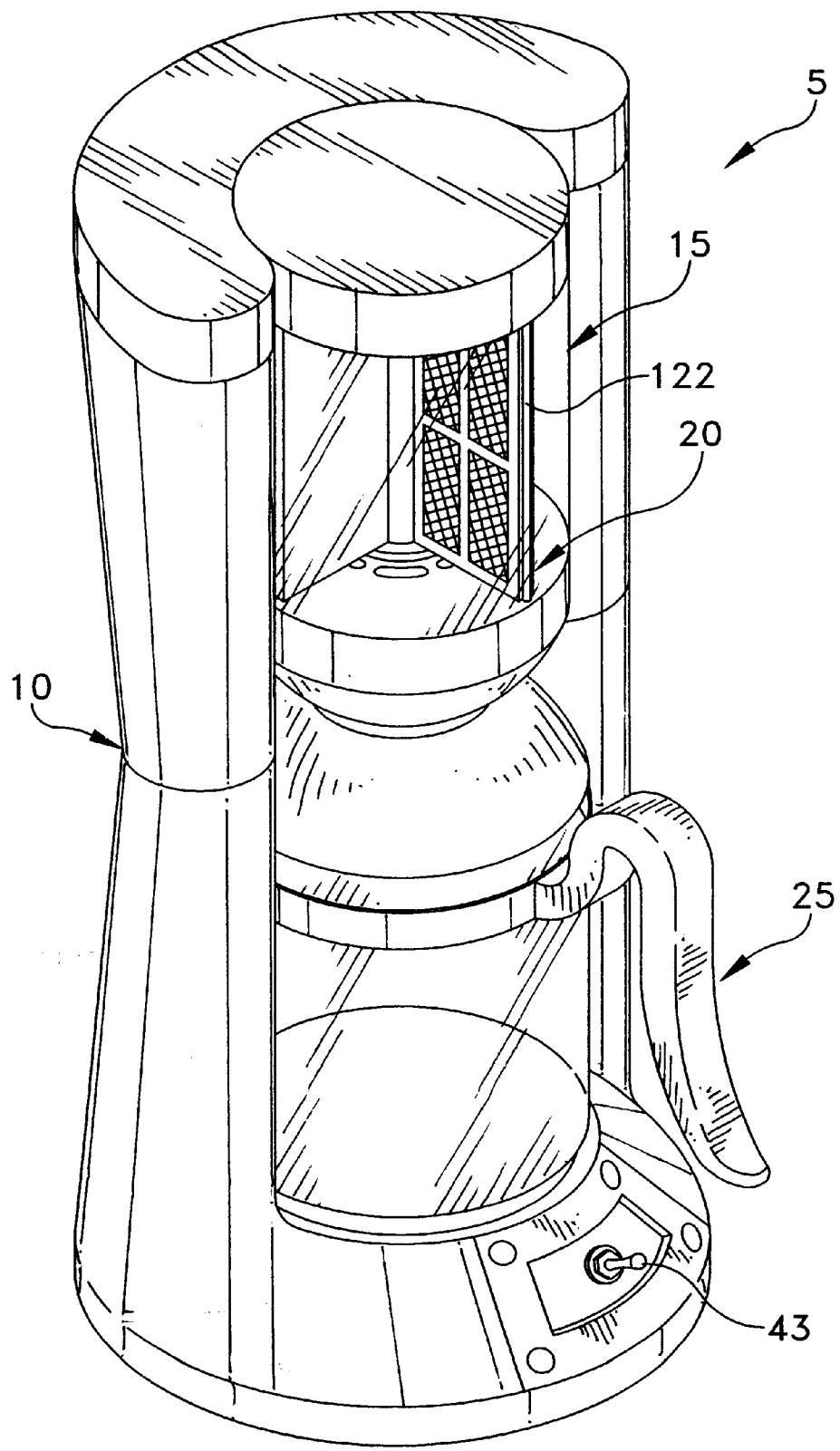
FIG. 1 is a perspective view of an beverage brewing press formed according to the present invention.

This description of preferred embodiments is intended to be read in connection with the accompanying drawings, which are to be considered part of the entire written description of this invention. In the description, relative terms such as "horizonal," "vertical," "up," "down," "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and normally are not intended to require a particular orientation. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Figure 2:
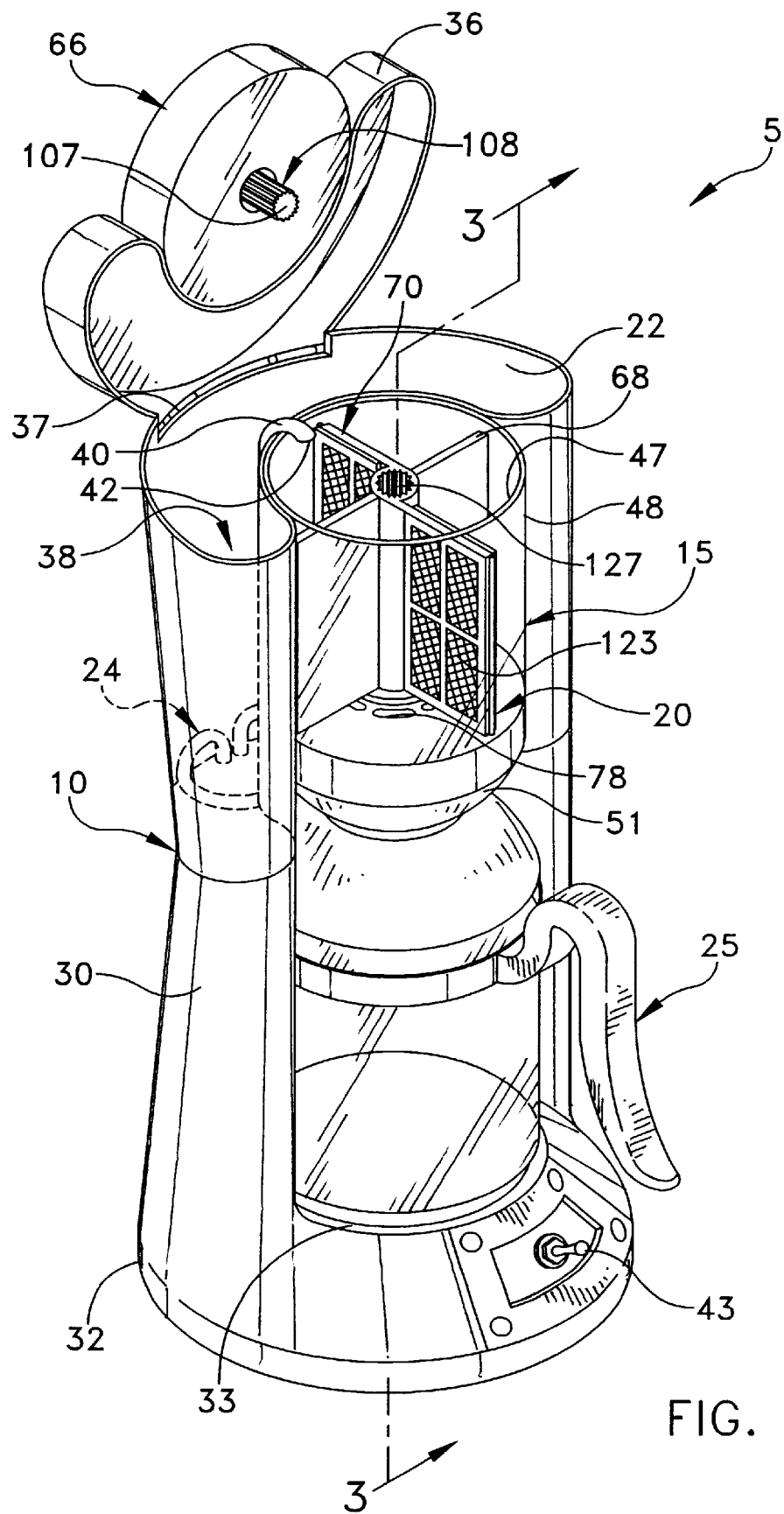
FIG. 2 is a perspective view of the beverage brewing press shown in FIG. 1, with a top lid pivoted upwardly to expose the interior of the brewing press.
Figure 3:
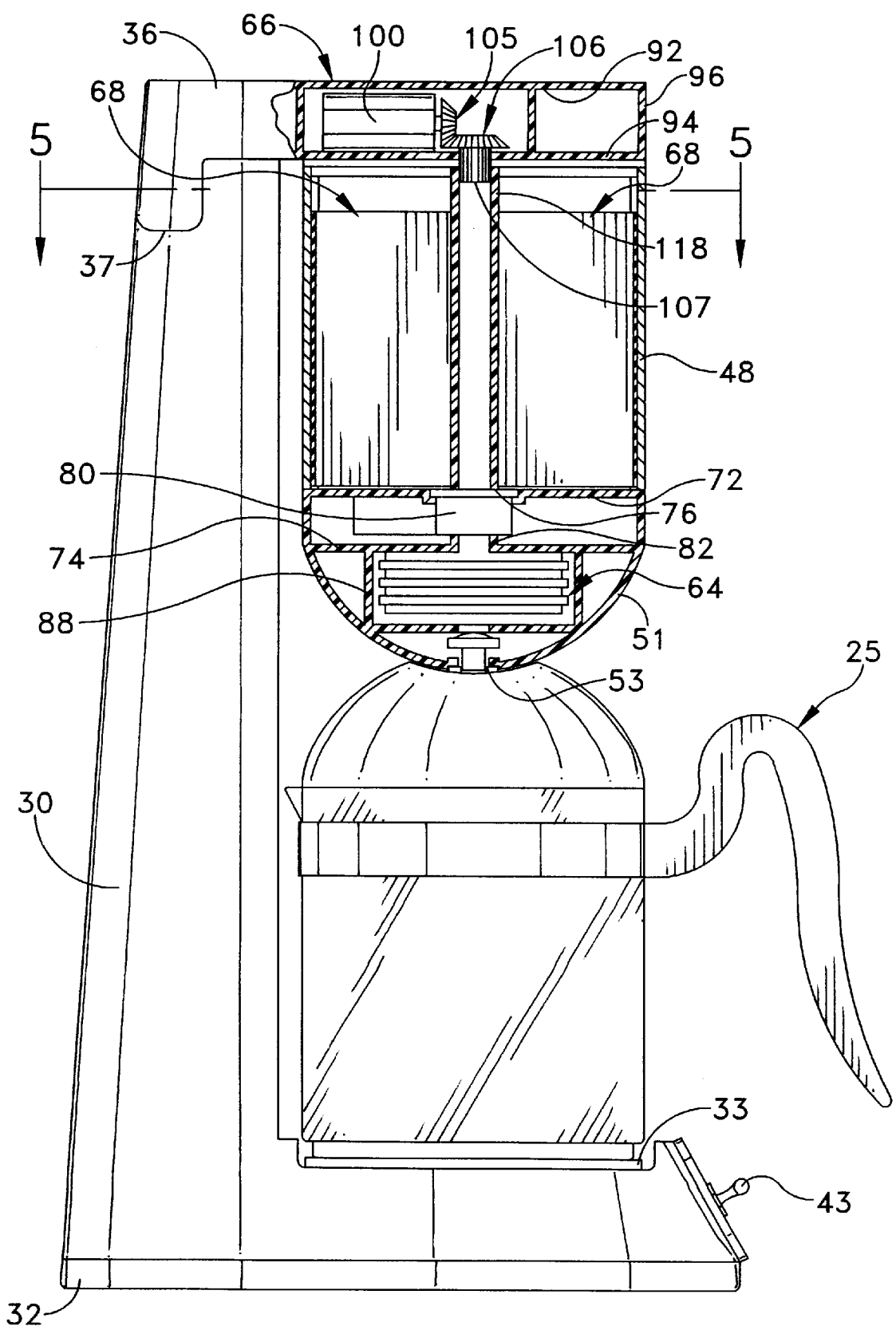
FIG. 3 is a cross-sectional view of the beverage brewing press shown in FIGS. 1 and 2, as taken along line 3—3 in FIG. 2.

Referring to FIGS. 1–3, a beverage press 5 formed in accordance with the present invention includes a housing 10, a brew vessel 15, and a brewing assembly 20. More particularly, housing 10 contains a liquid reservoir 22 and a heating unit 24, and supports brew vessel 15 and brewing assembly 20. A beverage receptacle 25, e.g., a cup, glass, carafe, pot or the like, is often placed adjacent to brew vessel 15 on housing 10 to receive the brewed beverage, but forms no part of the present invention. Housing 10 generally comprises an elongated body 30 having a flared base portion 32 and a heating plate 33. Housing 10 also includes a semi-cylindrical cap 36 pivotally attached to body 30 by a hinge mechanism 37. Together, body 30 and semi-cylindrical cap 36 define an internal cavity 38 within reservoir 22. A nozzle 40, having a port 42, is positioned above brew vessel 15 and brewing assembly 20. Nozzle 40 is dimensioned to slightly restrict the flow of heated water from heating unit 24, and to create a pressure build-up so that the heated water will be forced under pressure from port 42. Nozzle 40 is oriented to direct the stream of heated water into brew vessel 15 and brewing assembly 20.

Heating unit 24 and heating plate 33 form no part of the present invention and accordingly shall not be described in great detail. Heating unit 24 and heating plate 33 generally comprise heat generating elements of the type conventionally known and used in prior art automatic coffee makers. Broadly stated, heating elements of this type generally comprise of a metal wire or plate that generates a substantial amount of heat when an electrical current is passed through it. Such known heating elements are often controlled by a resettable thermostat. The thermostat is activated by a reciprocal switch 43 which extends through housing 10. The resettable thermostat, reciprocal switch 43, heating unit 24, and heating plate 33 are all well known to those skilled in the art.

Referring to FIGS. 2–7, brew vessel 15, as with all other operative portions of the present invention, may be formed from any of the well known materials used in connection with the preparation, heating, cooking, or general handling of foods and beverages, such as, stainless steel, ceramic, glass, or like materials. Brew vessel 15 includes an open end 47, a substantially cylindrical wall 48, a central axis 49 (FIG. 4), and a radiused bottom 51, which together define an internal chamber. In one embodiment of the present invention, brew vessel 15 has a diameter of about 15 to 20 centimeters or so, with bottom 51 having a radius of about 7 to 10 centimeters. Central axis 49 runs through a drain opening 53 that is located at about the center of radiused bottom 51. Brew vessel 15 is mounted on housing 30, adjacent to reservoir 22. In this way, nozzle 40 may be directed into brew vessel 15 so as to deliver a heated brewing liquid, such as water. In this arrangement, drain opening 53 is positioned directly above the entrance to beverage receptacle 25 (FIGS. 1–3). Appropriate mounting structures, such as brackets or the like (not shown) are provided on the inner surface of housing 30 for supporting brew vessel 15. Such support structures would be well known to those skilled in the art.

Figure 4:
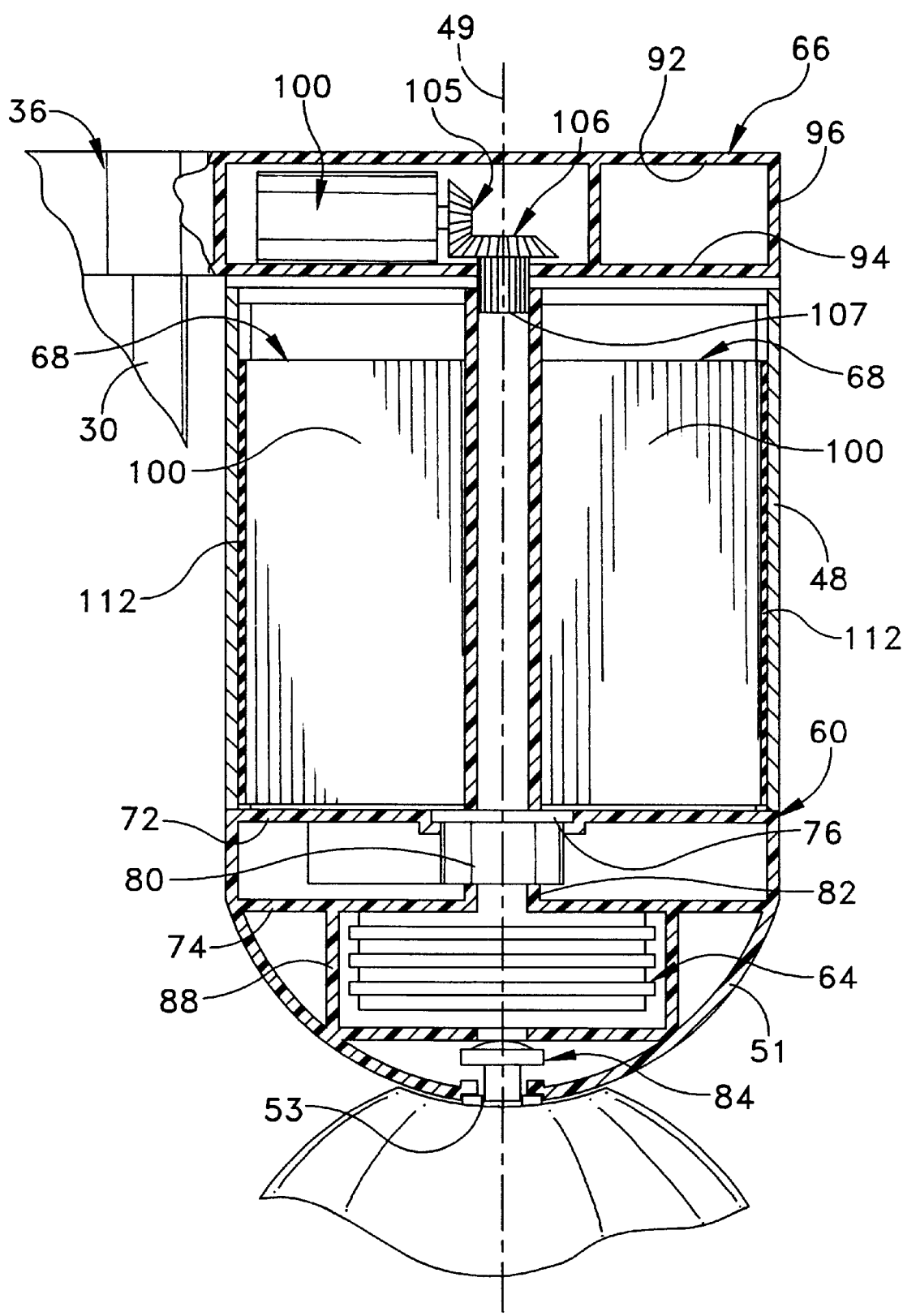
FIG. 4 is an enlarged and broken-away cross-sectional view of a brewing vessel portion of the beverage brewing press shown in FIG. 3.
Figure 5:
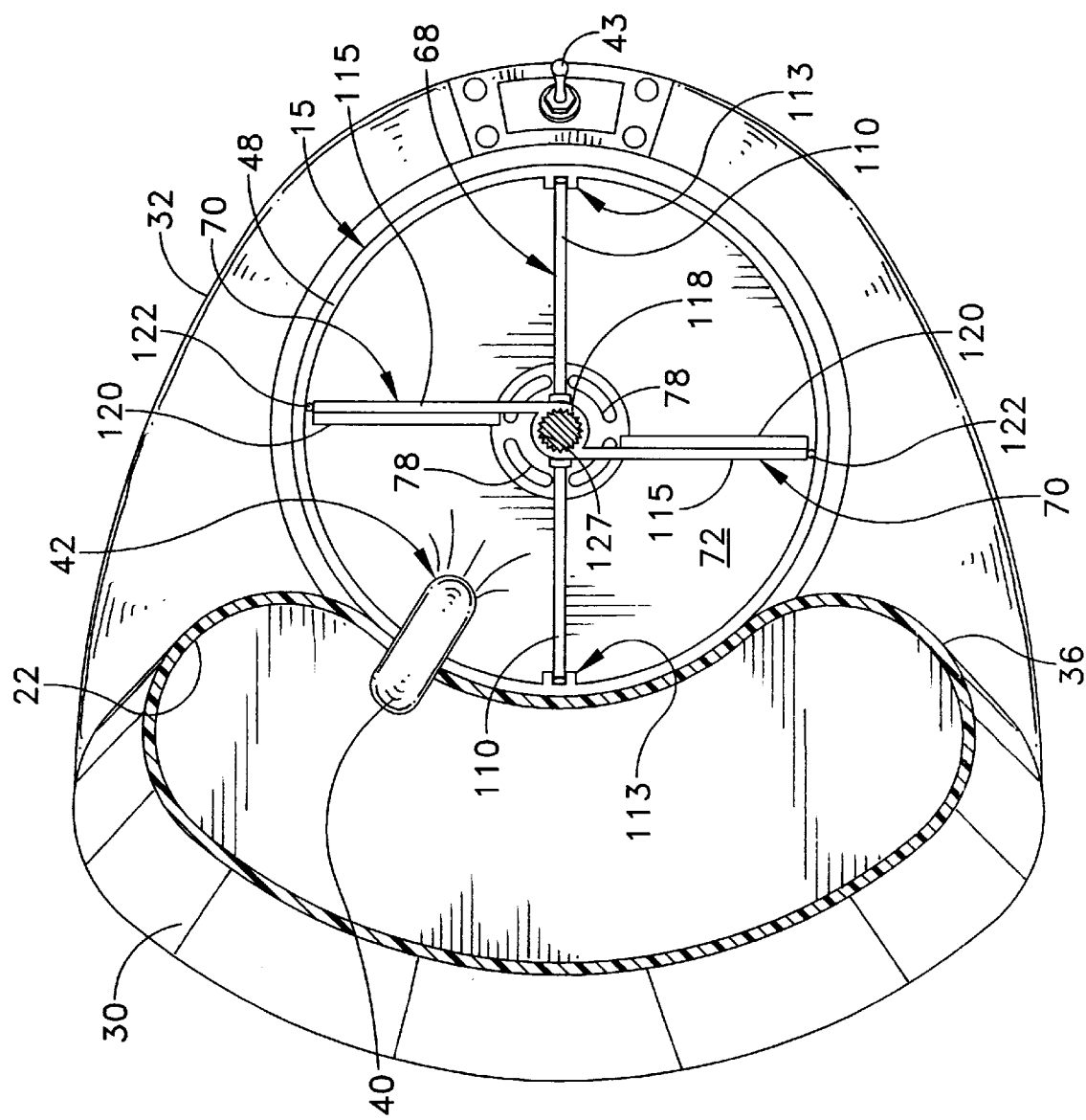
FIG. 5 is a top view of the beverage brewing press shown in FIGS. 1–3, as taken along line 5—5 in FIG. 3.

Referring to FIGS. 3–5, brewing assembly 20 is located within the internal chamber of brew vessel 15, and comprises a base 60, a valve 64, a cover 66, a fixed partition 68, and a movable partition 70. More particularly, base 60 includes an upper deck 72 and a lower deck 74 both of which have an outer diameter that is substantially the same as the diameter of the lower portions of brewing vessel 15. A bearing support 76 is centrally positioned on upper deck 72 and includes a plurality of drain openings 78. A drain cowl 80 is sealingly positioned between upper deck 72 and lower deck 74, and provides an intermediate receptacle into which plurality of drain openings 78 communicate. A conduit 82 communicates with plurality of drain openings 78, and extends through lower deck 74. A nozzle 84 is positioned on the terminal end opening of conduit 82. Nozzle 84 is sized and shaped to be sealingly received within drain opening 53 of brew vessel 15 so as to selectively direct brewed liquid into beverage receptacle 25.

A valve housing 88 is formed on the bottom surface of lower deck 74, and in surrounding relation to conduit 82 and valve 64. Valve 64 is located within valve housing 88 so as to be in selectively controlling flow communication with conduit 82. Valve 64 may comprise any of the conventional thermally, electrically, or mechanically actuated valves well known in the art for selectively regulating the flow of liquids.

Cover 66 is affixed to a portion of semi-cylindrical cap 36, and comprises a substantially cylindrical housing having a hollow interior defined by a top wall 92, a bottom wall 94, and a cylindrical side wall 96. Cover 66 has an outer diameter that is substantially the same as the diameter of the upper portion of brewing vessel 15 so that when semi-cylindrical cap 36 and cover 66 are pivoted downwardly, relative to housing 10, cover 66 engages and closes-off open end 47 of brew vessel 15. A seal or the like may be positioned on the bottom peripheral edge of cover 66 to enhance the engagement with cylindrical wall 48 of brew vessel 15. A drive motor 100 is supported by top or bottom walls 92, 94. Drive motor 100 may be selected from one of the various commercial electric motors that are often used in electrical home appliances, and well known in the art. A pair of bevel gears 105, 106 are arranged in operative relation with drive motor 100, with a central shaft 107 of bevel gear 106 projecting through a central portion of bottom wall 94. Shaft 107 may comprise engagement features 108, such as teeth or the like, that are complementary to a similar feature on a central portion of movable partition 70.

Fixed partition 68 is sized to fit snugly within brew vessel 15, and comprises a pair of substantially nonporous, rectangular walls 110 separated from one another by a central journal 111. A gasket 112 is attached to the peripheral edges of fixed partition 68 so as to create a substantial seal between those edges and cylindrical wall 48 of brew vessel 15. It will be understood that a suitably sized and arranged receptacle 113 may be deployed as an internal feature of brew vessel 15 (see FIGS. 6–7), or as a portion of base 60, that is positioned along the inner surface of cylindrical wall 48, so as to receive gasket 112 of fixed partition 68, and further fix and seal fixed partition 68 in place within brew vessel 15.

Movable partition 70 is sized to fit snugly within brew vessel 15, and comprises a pair of substantially rectangular walls 115 separated from one another by a central axle 118. Each rectangular wall 115 includes a hollow interior compartment 120 having at least one porous wall 123 that is spaced-apart from a semiporous portion of rectangular wall 115. Wall 123 may comprise a screen, mesh, cheesecloth, or porous paper, or a combination of these or like materials so long as wall 123 is substantially permeable to a brewing liquid. In this arrangement, wall 123 may or may not allow portions of the brewable material to permeate into the brewing liquid. Wall 123 may be hinged to rectangular wall 115 so that it may be opened and shut, thereby providing access to compartment 120. Compartment 120 is sized to enclose and confine a brewable flavor dispensing material, e.g., coffee, tea, herbal medicine, or the like between porous wall 123 and a semiporous portion of rectangular wall 115. A gasket 122 is attached to the peripheral edges of movable partition 70 so as to create a substantial seal between the edges of each rectangular wall 115 and cylindrical wall 48 of brew vessel 15.

Central axle 118 is centrally positioned, and extends the entire length of movable partition 70 thereby dividing rectangular walls 115. The top end of central axle 118 comprises means for operatively engaging central shaft 107 of bevel gear 106. For example, a bore 127 may comprise a plurality of inwardly projecting teeth 130 that are complementary to teeth 108 of central shaft 107. Of course, it will be understood that a bayonet mount, magnetic mount, or the like, or in fact any other device or structure that allows for the mechanical cooperation between shaft 107 and central axle 118 so as to allow central axle 118 to be driven, would be an equivalent to the foregoing. The bottom end of central axle 118 is journaled to bearing support 76 on upper deck 72 of base 60. In this way, moveable partition 70 may rotate about central axis 49, and relative to fixed partition 60.

The present invention is used to prepare a brewed beverage by first placing a brewable flavor dispensing material within hollow interior compartment 120, between porous wall 123 and a semiporous portion of rectangular wall 115. More particularly, porous wall 123 is opened and the brewable flavor dispensing material is inserted into the compartment. It will be understood that the brewable flavor dispensing material may be in a loose form or may be prepackaged in a permeable cloth, paper, or other container, e.g., a tea bag or sachet. Once the brewable flavor dispensing material is positioned within compartment 120, and porous wall 123 is shut so as to close compartment 120. In this configuration, brewing assembly 120 is ready to brew a beverage.

Figure 6:
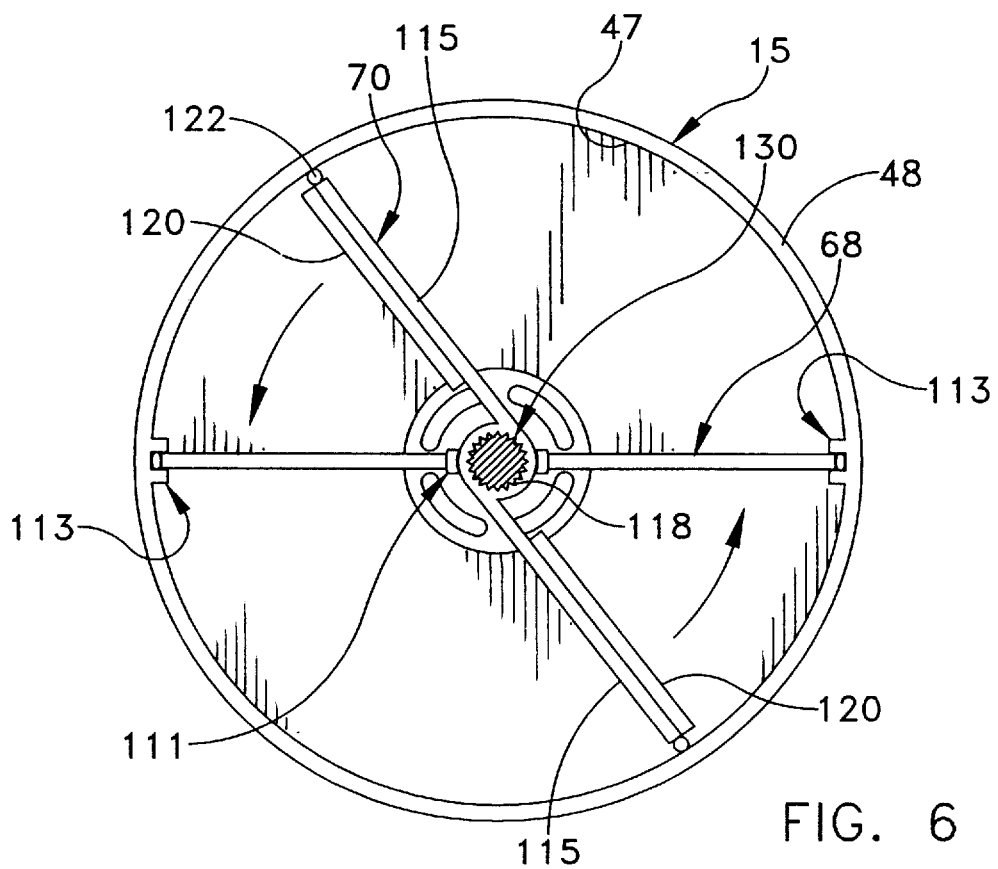
FIG. 6 is a top view of the brewing vessel and partitions, showing the preferred movement of one of the partitions relative to the other.
Figure 7:
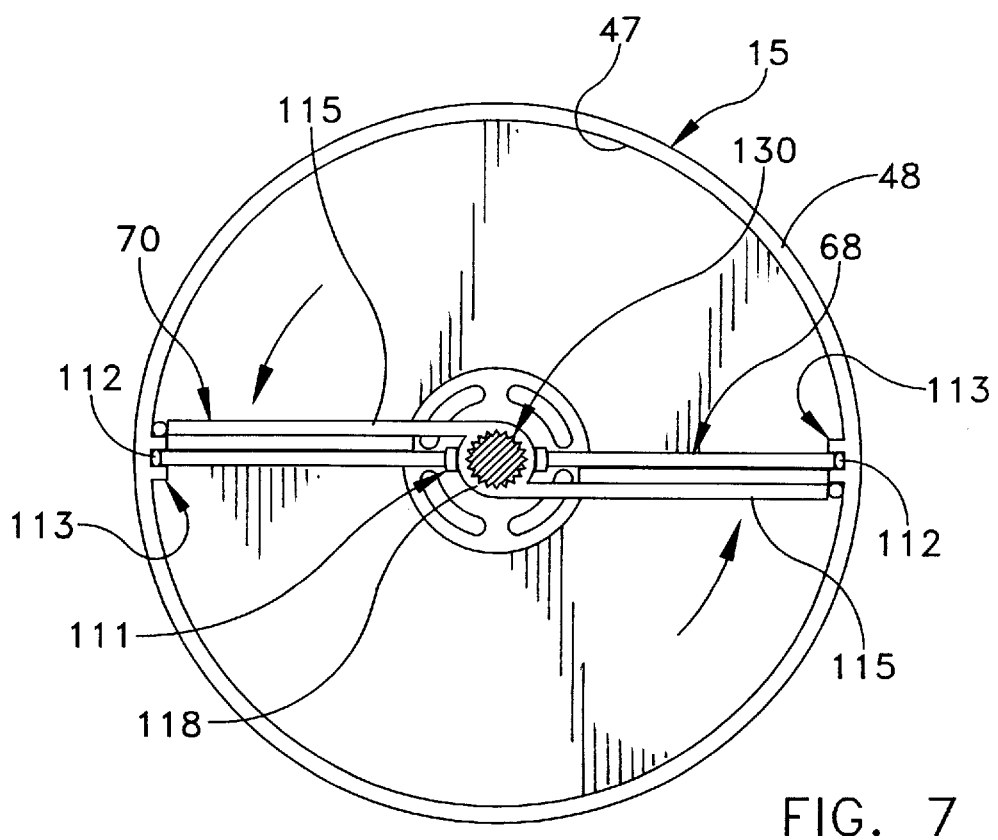
FIG. 7 is a top view of the brewing vessel and partitions, similar to that shown in FIG. 6, but showing the moveable partition pressing brewed material against a fixed partition, according to the invention.

Referring to FIGS. 5–7, a brewing liquid, e.g., water, is preheated within liquid reservoir 22 by heating unit 24 in a conventional manner. Once the liquid has reached a predetermined brewing temperature, the liquid is dispensed into brew vessel 15, via nozzle 40. It will be understood that the mechanisms for, and process of, heating and dispensing a brewing liquid in this manner are well known in the art.

Once brew vessel 15 has been filled with an appropriate quantity of brewing liquid, that brewing liquid permeates porous wall 123 and interacts with the brewable flavor dispensing material positioned within compartment 120 so as to infuse the liquid with the essence of the brewable material. It will be understood that the time for infusion may be appropriately set, depending upon the type of material to be brewed. Once the brew time has been achieved, e.g., approximately five minutes, moveable partition 70 is rotated toward fixed partition 68 so that particulate matter from the brewable flavor dispensing material that has escaped compartment 120 may be separated from the brewing liquid.

More particularly, drive motor 100 is activated so as to rotate bevel gears 105 and 106. As this occurs, teeth 108 of shaft 107 engage complementary teeth 130 of axle 118, thereby rotating partition 70 relative to fixed partition 68. As this occurs, grounds or other particulate flavor dispensing materials are swept toward fixed partition 68 by the movement of moveable partition 70 (FIG. 6). As this occurs, liquid is forced through compartment 120, and the flavor dispensing material, thereby further enhancing the infusion of flavor into the liquid. Moveable partition 70 continues to rotate until it engages the outer surface of fixed partition 168, so that most of the remaining liquid is squeezed through compartment 120 by the rotational motion of moveable partition 70 and its engagement with fixed partition 68. A sensor or power circuit may be incorporated within drive motor 100 to sense a particular load that corresponds to the engagement of moveable partition 70 with fixed partition 68, upon which signal drive motor 100 is disengaged.

Once moveable partition 70 has engaged fixed partition 68 and the remaining liquid is fully squeezed through the brewable flavor dispensing material within compartment 120, valve 64 is activated to open flow between plurality of drain opening 78 within upper deck 72 through conduit 82 and nozzle 84 so as to dispense the brewed beverage into beverage receptacle 25. It will be understood that valve 64 may be thermally, electrically, or mechanically actuated so as to selectively regulate the flow of the brewed liquid into beverage receptacle 25. In one preferred embodiment, valve 64 is thermally activated so that its opening is timed to correspond to the end of movement of moveable partition 70 and the brewing of the brewable beverage. The actuation of valve 64 may also be electrically triggered by the cessation of drive motor 100 in response to the completed movement of moveable partition 70.

Once the brewed beverage is dispensed to beverage receptacle 25, it may be poured for consumption. Brewing assembly 20 may then be disassembled to the extent that moveable partition 70 may be removed from brew vessel 15 so that the spent brewable flavor dispensing material may be removed from compartment 120 and washed. The internal chamber of brew vessel 15 and the remaining portions of brewing assembly 20 may also be cleansed by merely flushing the entire system with fresh water so as to remove any residual brewed liquid.

Of course, various changes and modifications may be made to beverage brewing press 5 within the scope of the present invention. For example, both partitions within brew vessel 15 may be arranged so as to be moveable toward one another to enhance the squeezing or pressing of brewing liquid through the brewable flavor dispensing material at the end of a brew cycle. Moreover, the single or double moveable partitions may be manually rotated rather than the use of a drive motor. Furthermore, other movements of movable partition 70 may also be used to force liquid through compartment 120, e.g. translational or otherwise. In addition, longitudinal axis 49 of brew vessel 15 does not necessarily have to be oriented vertically relative to housing 30, but may also be positioned at any other angle, including horizontally, relative to housing 30 without departing from the scope or spirit of the present invention.

It is to be understood that the present invention is by no means limited only to the particular constructions herein disclosed and shown in the drawings, but also comprises any modifications or equivalents within the scope of the claims.

What is claimed is:

1. A press for brewing a beverage comprising:
   a brew vessel defining a chamber having an axis and supported by a housing;
   a fixed partition positioned within said chamber; and
   a movable partition positioned within said chamber, that is movable about said axis relative to said fixed partition, and includes at least one porous receptacle that encloses a brewable material.

2. A brewing device according to claim 1 wherein said fixed partition is sized to fit snugly within said brew vessel, and comprises a pair of substantially nonporous, rectangular walls separated from one another by a central journal.

3. A brewing device according to claim 2 wherein said fixed partition includes a gasket so as to create a substantial seal with said brew vessel.

4. A brewing device according to claim 3 wherein said brew vessel includes a receptacle positioned along an inner surface so as to receive said gasket.

5. A brewing device according to claim 1 wherein said movable partition is rotatable about said axis.

6. A brewing device according to claim 1 wherein said movable partition is sized to fit snugly within said brew vessel, and comprises a pair of substantially rectangular walls separated from one another by a central axle.

7. A brewing device according to claim 6 wherein said at least one porous receptacle is positioned on one of said rectangular walls so as to form a hollow interior compartment having at least one porous wall that is spaced-apart from a semiporous portion of rectangular wall.

8. A brewing device according to claim 7 wherein said at least one porous wall is substantially permeable to a brewing liquid.

9. A brewing device according to claim 7 wherein said at least one porous wall is hinged to said rectangular wall so as to be openable and closeable, thereby a providing access to said receptacle.

10. A brewing device according to claim 7 wherein a gasket is attached to peripheral edges of said movable partition so as to create a substantial seal between said edges and said brew vessel.

11. A brewing device according to claim 7 wherein said axle is centrally positioned on said movable partition and includes means for operatively engaging means for rotating said movable partition.

12. A brewing device according to claim 1 comprising a valved conduit extending through a lower portion of said brewing vessel through which brewed liquid beverage can flow.

13. A brewing device according to claim 12 comprising means for rotating said movable partition.

14. A brewing device according to claim 1 wherein said brew vessel comprises a substantially cylindrical wall, an open end, and a radiused bottom which together define an internal chamber.

15. A brewing device according to claim 14 wherein said radiused bottom includes a drain opening.

16. A brewing device according to claim 15 further comprising a brewing assembly located within said brew vessel and comprising a base including an upper deck and a lower deck;
   a bearing support centrally positioned on said upper deck and including a plurality of drain openings;
   a drain cowl sealingly positioned between said upper deck and said lower deck, so as to provide an intermediate receptacle into which said plurality of drain openings communicate;
   a conduit communicating with said plurality of drain openings and extending through said lower deck; and
   a nozzle is positioned on a terminal end opening of said conduit, said nozzle being sized and shaped to be sealingly received within said drain opening of said brew vessel so as to selectively direct brewed liquid.

17. A brewing device according to claim 16 further comprising a valve housing formed on a bottom surface of said lower deck and having a valve within said valve housing in selectively controlling flow communication with said conduit.

18. A brewing device according to claim 17 wherein said valve is thermally actuated for selectively regulating the flow of a liquid.

19. A brewing device according to claim 14 further including a cover affixed to a portion of said housing, and comprising a substantially cylindrical housing having a hollow interior defined by a top wall, a bottom wall, and a cylindrical side wall, said cover having an outer diameter that is substantially the same as the diameter of said brew vessel and wherein means for rotating said movable partition are supported within said cover.

20. A brewing device according to claim 19 further including bevel gears arranged in operative relation with said means for rotating and including a shaft projecting through said bottom wall so as to operatively engage a portion of said movable partition.

21. A press for brewing a beverage comprising:
   a brewing vessel defining a chamber having an axis and supported by a housing;
   a fixed partition positioned within said chamber; and
   a rotatable partition positioned within said chamber, and rotatable about said axis relative to said fixed partition, said rotatable partition including at least one porous compartment for enclosing a brewable material.

22. A brewing device according to claim 21 wherein said brew vessel comprises a substantially cylindrical wall, an open end, and a radiused bottom which together define an internal chamber and wherein said radiused bottom includes a drain opening.

23. A brewing device according to claim 22 wherein said movable partition is sized to fit snugly within said brew vessel, and comprises a pair of substantially rectangular walls separated from one another by a central axle.

24. A brewing device according to claim 22 further comprising a brewing assembly located within said brew vessel and comprising a base including an upper deck and a lower deck;
   a bearing support centrally positioned on said upper deck and including a plurality of drain openings;
   a drain cowl sealingly positioned between said upper deck and said lower deck, so as to provide an intermediate receptacle into which said plurality of drain openings communicate;
   a conduit communicating with said plurality of drain openings and extending through said lower deck; and
   a nozzle is positioned on a terminal end opening of said conduit, said nozzle being sized and shaped to be sealingly received within said drain opening of said brew vessel so as to selectively direct brewed liquid.

25. A press for brewing a beverage comprising:
   a brew vessel supported by a housing and comprising a substantially cylindrical wall having a central axis, an open end, and a radiused bottom which together define an internal chamber and wherein said radiused bottom includes a drain opening;
   a fixed partition extending across said internal chamber; and
   a movable partition extending across said internal chamber and movable about said central axis relative to said fixed partition, and including at least one porous receptacle that encloses a brewable material.

* * * * *